US012735057B2

(12) United States Patent
Dietrich et al.

(10) Patent No.: US 12,735,057 B2
(45) Date of Patent: Sep. 15, 2026

(54) DEVICE AND METHOD FOR CONTROLLING THE LONGITUDINAL AND/OR LATERAL GUIDANCE OF A VEHICLE

(71) Applicant: Bayerische Motoren Werke Aktiengesellschaft, Munich (DE)

(72) Inventors: Christina Dietrich, Unterdiessen (DE); Michael Habermeier, Weilheim (DE); Niko Kirsamer, Munich (DE); Christian Rathgeber, Munich (DE); Philip Wolze, Hersbruck (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 291 days.

(21) Appl. No.: 18/575,362

(22) PCT Filed: Jun. 20, 2022

(86) PCT No.: PCT/EP2022/066709
§ 371 (c)(1),
(2) Date: Dec. 29, 2023

(87) PCT Pub. No.: WO2023/274768
PCT Pub. Date: Jan. 5, 2023

(65) Prior Publication Data

US 2024/0300503 A1 Sep. 12, 2024

(30) Foreign Application Priority Data

Jun. 30, 2021 (DE) ..................... 10 2021 116 878.3

(51) Int. Cl.
*B60W 50/06* (2006.01)
*B60W 50/00* (2006.01)
*B60W 50/02* (2012.01)

(52) U.S. Cl.
CPC ........ *B60W 50/06* (2013.01); *B60W 50/0205* (2013.01); *B60W 2050/0012* (2013.01); *B60W 2050/0031* (2013.01)

(58) Field of Classification Search
CPC ............. B60W 50/06; B60W 50/0205; B60W 2050/0012; B60W 2050/0031;
(Continued)

(56) References Cited

U.S. PATENT DOCUMENTS 11,305,815 B2 * 4/2022 Münch ................. B62D 15/025
12,371,031 B2 * 7/2025 Neulen ............... B60W 40/107
(Continued)

FOREIGN PATENT DOCUMENTS

DE 10 2009 056 674 A1 6/2011
DE 10 2016 201 205 A1 7/2017
(Continued)

OTHER PUBLICATIONS

Tal et al., Accurate Tracking of Aggressive Quadrotor Trajectories Using Incremental Nonlinear Dynamic Inversion and Differential Flatness, May 2021, IEEE Transactions on Control Systems Technology, vol. 29, No. 3, pp. 1203-1218 (Year: 2021).*
(Continued)

*Primary Examiner* — Kurt Philip Liethen
(74) *Attorney, Agent, or Firm* — Crowell & Moring LLP

(57) ABSTRACT

Methods, systems, and apparatuses are provided for controlling longitudinal and/or lateral guidance of a vehicle. A trajectory planner is configured to ascertain setpoint trajectory variables for a trajectory of the vehicle. The setpoint trajectory variables include a first trajectory state and a second trajectory state. The second trajectory state corresponds to a change in the first trajectory state over time. A feed-forward controller is configured to calculate a feed-forward control variable from the setpoint trajectory vari-
(Continued)

ables and from a model of dynamic behavior of the vehicle. The feed-forward control variable and the first trajectory state are variables of the same type. The device is configured to use the feed-forward control variable as a basis for determining a manipulated variable for a controlled system within the scope of the longitudinal and/or lateral guidance. The manipulated variable and the feed-forward control variable are variables of the same type.

16 Claims, 3 Drawing Sheets

(58) Field of Classification Search
CPC ..... B60W 30/18163; B60W 2050/065; B60W 2720/106
See application file for complete search history.

(56) References Cited

U.S. PATENT DOCUMENTS

| | | | | |
|---|---|---|---|---|
| 12,397,776 | B2 * | 8/2025 | Plaehn | B60W 10/04 |
| 2007/0185638 | A1 * | 8/2007 | Odenthal | B60W 40/11 701/70 |
| 2009/0143871 | A1 * | 6/2009 | Gao | G05B 13/04 703/2 |
| 2012/0316800 | A1 * | 12/2012 | Shteinhauz | G01M 17/025 702/56 |
| 2023/0311849 | A1 * | 10/2023 | Raste | B60W 10/04 701/22 |

FOREIGN PATENT DOCUMENTS

| | | | |
|---|---|---|---|
| DE | 10 2016 218 464 | B3 | 8/2017 |
| DE | 10 2018 125 250 | A1 | 4/2020 |
| DE | 10 2014 215 243 | B4 | 5/2020 |
| DE | 10 2019 217 023 | A1 | 11/2020 |

OTHER PUBLICATIONS

Faessler et al., Differential Flatness of Quadrotor Dynamics Subject to Rotor Drag for Accurate Tracking of High-Speed Trajectories, Apr. 2018, IEEE Robotics and Automation Letters, vol. 3, No. 2, pp. 620-626. (Year: 2018).*

International Search Report (PCT/ISA/210) issued in PCT Application No. PCT/EP2022/066709 dated Oct. 12, 2022 with English translation (5 pages).

German-language Written Opinion (PCT/ISA/237) issued in PCT Application No. PCT/EP2022/066709 dated Oct. 12, 2022 with English translation (9 pages).

German-language Search Report issued in German Application No. 10 2021 116 878.3 dated Jan. 21, 2022 with partial English translation (12 pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

Rathgeber, "Trajektorienplanung und-folgeregelung für assistiertes bis hochautomatisiertes Fahren", 2016, pp. 1-160, XP055664612; retrieved from Internet: https://d-nb.info/1156181089/34 (160 pages).

* cited by examiner

DEVICE AND METHOD FOR CONTROLLING THE LONGITUDINAL AND/OR LATERAL GUIDANCE OF A VEHICLE

BACKGROUND AND SUMMARY

The present subject matter relates to an electronic device and a method for controlling the longitudinal and/or lateral guidance of a vehicle.

The present subject matter can in particular be used within the scope of a driver-assistance system (DAS), wherein the longitudinal and/or lateral guidance of the vehicle is controlled in such a way that a driving task predefined by the DAS is performed. The DAS can thereby facilitate at least semi-automated driving, possibly up to fully automated driving, of the vehicle.

The term "automated driving" within the scope of the document is understood to mean driving with automated longitudinal and/or lateral guidance. Automated driving can be for example driving for an extended period of time on the freeway or driving for a limited period of time when parking. The term "automated driving" encompasses automated driving with any level of automation. Exemplary levels of automation are assisted, semi-automated, highly automated, fully automated and autonomous driving (with the level of automation respectively increasing). The aforementioned five levels of automation correspond to SAE levels 1 to 5 of SAE standard J3016 (SAE-Society of Automotive Engineering). In the case of assisted driving (SAE level 1), the system carries out the longitudinal or lateral guidance in specified driving situations. In the case of semi-automated driving (SAE level 2), the system takes over the longitudinal and lateral guidance in specified driving situations, wherein the driver, as in the case of assisted driving, needs to monitor the system on an ongoing basis. In the case of highly automated driving (SAE level 3), the system takes over the longitudinal and lateral guidance in specified driving situations without the driver needing to monitor the system on an ongoing basis; however, the driver must be capable of taking over the vehicle guidance within a certain time when requested by the system. In the case of fully automated driving (SAE level 4), the system takes over the vehicle guidance in specified driving situations even if the driver does not respond to a request to intervene, meaning that the driver as a fall-back option is omitted. In the case of autonomous driving (SAE level 5), the system is able to carry out all aspects of the dynamic driving task under every road and environmental condition that are also handled by a human driver. SAE level 5 thus corresponds to driverless driving in which the system can automatically cope with all situations throughout the entire journey in the same way as a human driver; a driver is generally no longer necessary.

Automated driving functions require a high-performance controller which ensures that the vehicle follows the planned trajectory. For this purpose, model-based approaches are commonly relied upon. These consider presumed system dynamics directly in the controller design. This means that, for controlling the longitudinal and/or lateral guidance of a vehicle, use is made of vehicle models which describe behavior of the vehicle in an approximate manner. In this case, controlling the longitudinal or lateral guidance typically involves inverting such vehicle models in order to ascertain which inputs have to be sent to the vehicle in order to ensure desired behavior of the vehicle (e.g. a journey along a desired trajectory). This can be performed within the scope of so-called feed-forward control.

For example, German patent specification DE 10 2014 215 243 B4 describes a controller which is configured to determine, based on one or more setpoint trajectory variables for the trajectory of a vehicle, a steering input for a power-assisted steering system of the vehicle as a controller output variable. The controller comprises a feed-forward controller which uses a model relating to the dynamic behavior of the vehicle and is configured to use the setpoint trajectory variables as a basis for ascertaining corresponding feed-forward control variables. In this case, the setpoint trajectory variables and the corresponding feed-forward control variables are brought forward by a dead time, wherein the dead time depends on a time delay when the steering input is being executed by the power-assisted steering system.

A vehicle dynamics model on which such a feed-forward controller is based can generally be specified in the form of a transfer function $G(s)$ in the Laplace domain (i.e. as a function of a complex frequency variable s). The feed-forward controller is intended to compensate for the vehicle dynamics as much as possible in such a way that it realizes a transfer system that is inverse to the vehicle dynamics and that in many cases can be represented by the inverse transfer function $G^{-1}(s)$. In this case, the inverse transfer system must be stable so that it is able to be realized. The statement that a transfer function $G(s)$ is invertible can in particular be understood to mean that the transfer function $G(s)$ is stable (i.e. that the zeros of $G(s)$ have negative real parts since these become poles or eigenvalues of the inverted transfer function $G^{-1}(s)$). As a further condition, it can additionally be provided that there is a pole-zero excess. This means that at least as many zeros as poles need to be present in order for the transfer function to be realized without a filter. In the sense of the present description, a transfer system is non-invertible if at least one of the two aforementioned conditions is not met.

Even if non-invertible vehicle dynamics are presumed, in order to make possible a feed-forward controller which considers the system dynamics, the transfer system is commonly inverted using a filter. It is disadvantageous in this case that the design of the filter is often not straightforward and that the filter generally entails delay times.

An alternative, simulation-based solution approach is based on a closed-loop simulation using a virtual control loop which considers the vehicle dynamics (cf., e.g., C. Rathgeber, "Trajektorienplanung und-folgeregelung für assistiertes bis hochautomatisiertes Fahren", TU Berlin 2016, Chapter 4.7 retrievable online at: http://dx.doi.org/10.14279/depositonce-5506). Such approaches are also comparatively complex to implement.

An object of the present subject matter is to specify an electronic device and a method for controlling the longitudinal and/or lateral guidance of a vehicle, wherein the control is intended to comprise feed-forward control which can be implemented in an efficient manner in particular even if non-invertible vehicle dynamics are presumed.

The object is achieved by an electronic device and a method according to the independent patent claims. Advantageous examples are specified in the dependent claims.

A first aspect of the present subject matter relates to an electronic device for controlling the longitudinal and/or lateral guidance of a vehicle.

The vehicle can in particular be a motor vehicle. The term "motor vehicle" in this case can in particular be understood to mean a land vehicle which is moved by engine power without being attached to tracks. A motor vehicle in this sense can, e.g., be in the form of a motor car, motorcycle or tractor unit.

The vehicle can be equipped with a driver-assistance system (DAS). The DAS can be configured to perform functions within the scope of at least semi-automated driving of a motor vehicle, such as, e.g., an ACC function (i.e. adaptive cruise control), a lane-change-assistance function (LCA), a parking-assistance function or the like.

The electronic device comprises a trajectory planner which is configured to ascertain setpoint trajectory variables for a trajectory of the vehicle. In this case, the setpoint trajectory variables can in particular be determined based on a driving task predefined, e.g., by a DAS.

The setpoint trajectory variables comprise at least a first trajectory state and a second trajectory state, wherein the second trajectory state corresponds to a change in the first trajectory state over time.

According to some examples, the setpoint trajectory variables comprise at least a first trajectory state, a second trajectory state and a third trajectory state, wherein the second trajectory state corresponds to a change in the first trajectory state over time, and wherein the third trajectory state corresponds to a change in the second trajectory state over time.

For example, for controlling the lateral guidance of the vehicle, the trajectory planner can ascertain, as setpoint trajectory variables for controlling the lateral guidance of the vehicle, a setpoint curvature as the first trajectory state, a first temporal derivative of the setpoint curvature as the second trajectory state and a second temporal derivative of the setpoint curvature of a planned trajectory as the third trajectory state. Alternatively, or in addition, for controlling the longitudinal guidance, the trajectory planner can ascertain, as setpoint trajectory variables, e.g., a setpoint (longitudinal) acceleration, a first derivative of the setpoint acceleration (i.e. a jerk) and a second derivative of the setpoint acceleration.

The electronic device further comprises a feed-forward controller which is configured to calculate a feed-forward control variable from—and preferably solely from—the setpoint trajectory variables and a model of the dynamic behavior of the vehicle. In this case, the feed-forward control variable and the first trajectory state are variables of the same type. It can in particular be understood below that the feed-forward control variable and the first trajectory state are variables with the same physical dimensions. For example, if the first trajectory state is a curvature, the feed-forward control variable is likewise a curvature, and if the first trajectory state is an acceleration, the feed-forward control variable is likewise an acceleration.

The model can be a vehicle-specific dynamic transfer model which, e.g., approximately characterizes a response of the vehicle to a particular manipulated variable, such as, e.g., a longitudinal acceleration or a steering angle (or a change in steering angle) and in this case preferably also considers a time response of a subordinate actuator system for the longitudinal or lateral guidance of the vehicle. According to some examples, the model can thus also consider influences of one or more subordinate controllers, such as, e.g., controllers of the actuator system or of a vehicle-following controller.

The electronic device is configured to use the feed-forward control variable as a basis for determining a manipulated variable for a controlled system within the scope of the longitudinal and/or lateral guidance, wherein the manipulated variable and the feed-forward control variable are variables of the same type. In this case, it is also possible in principle for the feed-forward control variable itself to be the manipulated variable. The statement according to which the electronic device uses the feed-forward control variable for "determining" the manipulated variable thus also includes the case in which the feed-forward control variable itself is further passed on to the controlled system as the manipulated variable.

As explained further above with regard to the first trajectory state and the feed-forward control variable, with regard to the feed-forward control variable and the manipulated variable, the statement that those two variables are variables of the same type can also in particular be understood to mean that they are variables with the same physical dimensions. That is to say that in the example in which the first trajectory state is a curvature, both the feed-forward control variable and the manipulated variable for the controlled system are likewise curvatures.

The controlled system can also comprise, e.g., in addition to an actuator system for the longitudinal and/or lateral guidance, one or more controllers, such as, e.g., a vehicle guidance controller, and/or one or more subordinate controllers, such as, e.g., controllers of the actuator system. This will be explained in more detail further below using examples.

According to some examples, the electronic device can comprise the controlled system.

According to one preferred example, the model is a linear transfer model, i.e. a model of a linear transfer system. However, a non-linear transfer model can in principle also be used.

Mathematically, the model can be described, e.g., in a manner known per se by a transfer function $\tilde{G}_{vehicle}(s)$ in the frequency domain. In the case of lateral guidance control, the transfer function $\tilde{G}_{vehicle}(s)$ can describe, e.g., the response of the vehicle to a steering movement.

The model can be illustrated, e.g., by a system of differential equations in a state space. For example, in the context of the lateral guidance control, it is possible to approximately model lateral dynamics of the vehicle according to the single-track model considering the corresponding actuator system (i.e. the steering) using a second-order transfer function $\tilde{G}_{vehicle}(s)$. The longitudinal dynamics of the vehicle are typically determined substantially by the dynamics of the actuators, engine and brake and can likewise be described well by a second-order transfer function $\tilde{G}_{vehicle}(s)$. For example, the transfer model can be a PDT2 or PT2 model (however, a PT1 model or a PT4 model is, e.g., also conceivable). In principle, any transfer function is possible, provided that suitable states (i.e., e.g., in the case of an nth-order transfer function, in particular also an nth trajectory state which corresponds to an nth derivative of a first trajectory state) can be provided in the application.

In particular, the model can describe a non-invertible transfer system or, within the scope of the feed-forward control, can be represented by a non-invertible transfer function $\tilde{G}_{vehicle}(s)$ (in the sense explained further above).

According to one example, the feed-forward controller is configured to approximately compensate for dynamic behavior of the vehicle corresponding to the model (possibly including the influences of an actuator system and of one or more subordinate controllers). In this case, the feed-forward controller can calculate, based on the model, which actuation inputs have to be sent to an actuator system of the vehicle in order to ensure desired behavior of the vehicle and thus realize a vehicle trajectory in line with the setpoint trajectory variables.

In this case, it also lies within the scope of the present subject matter that the feed-forward controller can be configured to calculate the feed-forward control variable without applying a filter. The advantage arises here that the complexity can be reduced and that, due to there being no filter, no additional delay time is introduced, meaning that the performance of the controller is increased.

According to one example, the model of the dynamic behavior of the vehicle can be described, in the feed-forward controller, by a transfer function (in the Laplace domain) in the form $$\tilde{G}_{vehicle}(s) = \frac{b_n s^n + b_{n-1} s^{n-1} + \ldots + b_1 s + b_0}{a_m s^m + a_{m-1} s^{m-1} + \ldots + a_1 s + a_0}.$$

In this case, s is a complex frequency variable, m and n are natural numbers and $a_0, \ldots, a_m$, $b_0, \ldots, b_m$ are real parameters. In other words, the transfer function can be represented as a quotient of nth or mth-order polynomials.

For example, in one example, the model of the dynamic behavior of the vehicle can be described, in the feed-forward controller, by a transfer function in the form $$\tilde{G}_{vehicle}(s) = \frac{1}{a_1 s + a_0}.$$

In this case, if w, $\dot{w}$ are the setpoint trajectory variables and $u_{vs}$ is a feed-forward control variable that is to be determined in the feed-forward controller, the feed-forward control variable $u_{vs}$ is calculated from the setpoint trajectory variables w, w and the parameters $a_0$, $a_1$ of the transfer function as $$u_{VS} = \dot{w} a_1 + w a_0.$$

In a further example which can relate, e.g., to longitudinal guidance control, the model of the dynamic behavior of the vehicle can be described, in the feed-forward controller, by a transfer function in the form $$\tilde{G}_{vehicle}(s) = \frac{1}{a_2 s^2 + a_1 s + a_0}.$$

In this case, if $\ddot{a}_{traj}$, $\dot{a}_{traj}$, $a_{traj}$ are the setpoint trajectory variables and $a_d$ is a feed-forward control variable that is to be determined in the feed-forward controller, the feed-forward control variable $a_d$ is calculated from the setpoint trajectory variables $\ddot{a}_{traj}$, $\dot{a}_{traj}$, $a_{traj}$ and the parameters $a_0$, $a_1$, $a_2$ of the transfer function as $$a_d = \ddot{a}_{traj} a_2 + \dot{a}_{traj} a_1 + a_{traj} a_0.$$

For example, the setpoint trajectory variables $\ddot{a}_{traj}$, $\dot{a}_{traj}$, $a_{traj}$ can be a setpoint (longitudinal) acceleration $a_{traj}$ and a first and second temporal derivative thereof, respectively. However, the setpoint trajectory variables can also be a variable $a_{traj}$ other than a setpoint acceleration and a first and second temporal derivative thereof, respectively.

According to a further example which can relate, e.g., to lateral guidance control, the model of the dynamic behavior of the vehicle can be described, in the feed-forward controller, by a transfer function in the form $$\tilde{G}_{vehicle}(s) = \frac{b_2 s^2 + b_1 s + b_0}{a_2 s^2 + a_1 s + a_0}.$$

In this case, if $\ddot{k}_{traj}$, $\dot{k}_{traj}$, $k_{traj}$ are the setpoint trajectory variables and $k_d$ is a feed-forward control variable that is to be determined in the feed-forward controller, the feed-forward control variable $k_d$ is calculated from the setpoint trajectory variables $\ddot{k}_{traj}$, $\dot{k}_{traj}$, $k_{traj}$ and the parameters $a_0$, $a_1$, $a_2$, $b_0$, $b_1$, $b_2$ of the transfer function using the equation $$\ddot{\kappa}_d = \frac{1}{b_2}(\dot{\kappa}_d b_1 + \kappa_d b_0 - \ddot{\kappa}_{traj} a_2 - \dot{\kappa}_{traj} a_1 - \kappa_{traj} a_0)$$

(or an adjusted or equivalent equation). For example, the feed-forward control variable $k_d$ can be calculated using second integration steps in this case.

For example, the setpoint trajectory variables $\ddot{k}_{traj}$, $\dot{k}_{traj}$, $k_{traj}$ can be a setpoint curvature $k_{traj}$ and a first and second temporal derivative thereof, respectively. However, the setpoint trajectory variables can also be a variable $k_{traj}$ other than a setpoint curvature and a first and second temporal derivative thereof, respectively.

It should be noted that the feed-forward controller does not necessarily have to directly determine an actuation input for an actuator system of the vehicle, such as, e.g., a steering angle input or steering torque input for the lateral guidance or a longitudinal acceleration input for the engine or brake. Rather, the feed-forward control variable determined by the feed-forward controller can initially be further processed in one or more downstream controllers, such as, e.g., a trajectory-following controller, vehicle guidance controller and/or a subordinate steering or engine controller. In other words, the feed-forward controller can determine the feed-forward control variables in such a way that they, when they are further processed in the controller, result in the controlled system realizing the setpoint trajectory variable(s) and the vehicle following the planned trajectory.

According to one example, the electronic device comprises a trajectory-following controller which is configured to use the feed-forward control variable as a basis for determining the manipulated variable. In this case, the electronic device can be configured to ascertain, using the trajectory-following controller, one or more control errors based on one or more reference variables and one or more feedback variables (e.g. as the difference between a reference variable and a feedback variable), to correct the feed-forward control variable based on the one or more control errors (e.g. by adding the control error to the feed-forward control variable) and to determine the manipulated variable as the corrected feed-forward control variable or based on the corrected feed-forward control variable. For example, a setpoint trajectory variable or a variable derived from one or more setpoint trajectory variables can be used as the reference variable in this case. A corresponding actual trajectory variable or a variable derived from one or more actual trajectory variables can, e.g., be used as the feedback variable.

It furthermore lies within the scope of the present subject matter that the controlled system can comprise a vehicle guidance controller (downstream of the trajectory-following controller, if present) which is configured to use the manipulated variable as a basis for determining an actuation input for an actuator system for the lateral and/or longitudinal guidance of the vehicle. The vehicle guidance controller can thus, e.g. within the scope of lateral guidance control, convert a corrected feed-forward control variable in the form of a curvature input into an actuation input for the steering of the vehicle in the form of a setpoint steering angle.

A second aspect of the present subject matter is a method for controlling the longitudinal and/or lateral guidance of a vehicle, having the steps of:

- ascertaining setpoint trajectory variables for a trajectory of the vehicle, wherein the setpoint trajectory variables comprise at least a first trajectory state and a second trajectory state, wherein the second trajectory state corresponds to a change in the first trajectory state over time;
- calculating, using a feed-forward controller, a feed-forward control variable from the plurality of setpoint trajectory variables and from a model of the dynamic behavior of the vehicle, wherein the feed-forward control variable and the first trajectory state are variables of the same type; and
- determining, based on the feed-forward control variable, a manipulated variable for a controlled system within the scope of the longitudinal and/or lateral guidance, wherein the manipulated variable and the feed-forward control variable are variables of the same type.

The method according to the second aspect of the present subject matter can be performed using a device according to the first aspect of the present subject matter. Examples of the method according to the present subject matter can therefore correspond to the advantageous examples of the electronic device according to the present subject matter that are described above and below, and vice versa.

A third aspect of the present subject matter is a computer program which, when it is executed on a computing device, causes the computing device to perform the method according to the second aspect of the present subject matter. In particular, the computer program can be used to realize a controller having a feed-forward controller as described in the present document in combination with the electronic device according to the first aspect of the present subject matter.

According to some examples, the computer program can comprise a plurality of parts which can each be performed on different computing devices (such as, e.g., a plurality of processors) which are possibly physically remote from one another.

For example, a device according to the first aspect of the present subject matter can comprise one or more computing devices on which a computer program according to the third aspect of the present subject matter is able to be executed.

A fourth aspect of the present subject matter is a non-transitory computer-readable (storage) medium on which a computer program according to the third aspect of the present subject matter is stored.

A fifth aspect of the present subject matter is a vehicle having a device according to the first aspect of the present subject matter.

DETAILED DESCRIPTION OF THE DRAWINGS

The steps 11-13, shown in the block diagram according to FIG. 1, of a method 1 for controlling the longitudinal and/or lateral guidance of a vehicle FZG are explained below, wherein reference is made at the same time to the diagram shown in FIG. 2 which illustrates a corresponding controller.

First of all, in a step 11 of the method 1, setpoint trajectory variables $w$, $\dot{w}$, $\ddot{w}$ for a trajectory of the vehicle FZG are ascertained. In this example, the setpoint trajectory variables comprise a first trajectory state $w$, a second trajectory state $w$ and a third trajectory state $\ddot{w}$, wherein the second trajectory state $w$ corresponds to a change in the first trajectory state $w$ over time, and wherein the third trajectory state $w$ corresponds to a change in the second trajectory state $\ddot{w}$ over time. However, examples are also conceivable which make do without such a third trajectory state $\ddot{w}$, i.e. in which only a first trajectory state $w$ and a second trajectory state $w$ are used as setpoint trajectory variables, wherein the second trajectory state $\dot{w}$ corresponds to a change in the first trajectory state $w$ over time.

Figure 2:
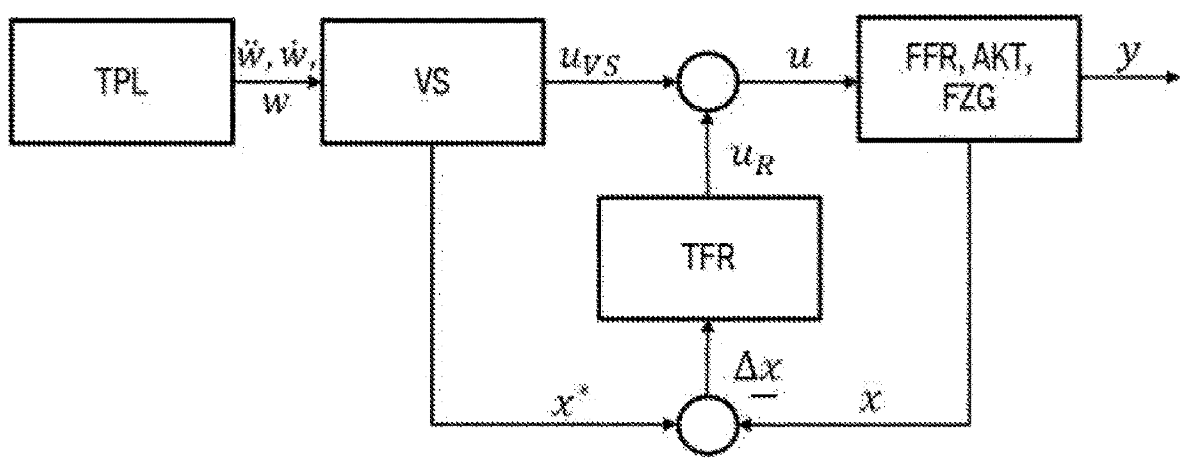
FIG. 2 schematically illustrates by way of example a controller together with a feed-forward controller for the longitudinal and/or lateral guidance of a vehicle.

The setpoint trajectory variables $w$, $\dot{w}$, $\ddot{w}$ can be ascertained using a software module which is referred to as a trajectory planner TPL, cf. FIG. 2. In this case, the setpoint trajectory variables $w$, $\dot{w}$, $\ddot{w}$ can be determined in particular based on a driving task predefined, e.g., by a DAS.

For example, the trajectory planner TPL can ascertain, within the scope of a lane-change-assistance function (LCA) of a DAS, a suitable trajectory for an imminent lane change of the vehicle FZG. The trajectory can, e.g., be described by the statement of a temporal profile of its curvature $k_{traj}(t)$. In this case, e.g., the curvature, $k_{traj}$, the first temporal derivative of the curvature, $k_{traj}$, and the second temporal derivative of the curvature, $\ddot{k}_{traj}$, of the planned trajectory can be determined as the setpoint trajectory variables $w$, $w$, $w$ for controlling the lateral guidance of the vehicle FZG. This example is described in greater detail further below with reference to FIG. 6. Setpoint trajectory variables $w$, $w$, $w$ for controlling the longitudinal guidance, which is explained more specifically further below with reference to FIG. 5, can be, e.g., the (longitudinal) acceleration, $a_{traj}$, the first derivative of the acceleration (i.e. the jerk), $\dot{a}_{traj}$, and the second derivative of the acceleration, $\ddot{a}_{traj}$.

In a further step 12 of the method 1, a feed-forward controller VS is used to determine a feed-forward control variable $u_{vs}$ from the setpoint trajectory variables $w$, $\dot{w}$, $\ddot{w}$ and from a model of the dynamic behavior of the vehicle FZG, wherein the feed-forward control variable $u_{vs}$ and the first trajectory state $w$ are variables of the same type (i.e., e.g., both variables $u_{vs}$, $w$ are accelerations or both variables $u_{vs}$, $w$ are curvatures).

In a further step 13, the feed-forward control variable $u_{vs}$ is used as a basis for determining a manipulated variable $u$ for a controlled system FFR, AKT, FZG within the scope of the longitudinal and/or lateral guidance, wherein the manipulated variable and the feed-forward control variable are variables of the same type, cf. FIG. 2.

The feed-forward controller VS is configured to calculate the feed-forward control variable $u_{vs}$ from the setpoint trajectory variables w, w, w and from a simplified model of the dynamic behavior of the vehicle FZG.

The feed-forward controller VS is configured to approximately compensate for dynamic behavior of the vehicle FZG corresponding to the model. In this case, the feed-forward controller VS ascertains, based on the model, which actuation inputs have to be sent to an actuator system AKT of the vehicle in order to ensure desired behavior of the vehicle FZG and to thus realize a vehicle trajectory in line with the setpoint trajectory variables w, w, w (or, depending on the example, e.g., even only w, w).

Figure 3:
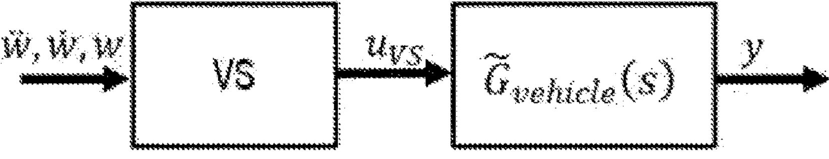
FIG. 3 schematically illustrates a feed-forward controller which can be used within the scope of controlling the longitudinal and/or lateral guidance of a vehicle.

FIG. 3 illustrates the principle of a feed-forward controller VS, using a simplified diagram. In this example, the actual trajectory variable y realized by the vehicle FZG arises as the product of the transfer function $\tilde{G}_{vehicle}(s)$, which approximately describes the dynamic behavior of the vehicle FZG including the actuator system AKT (or an entire controlled system FFR, AKT, FZG which in addition to the actuator system AKT can also comprise, e.g., a vehicle guidance controller FFR and possibly further subordinate controllers), and of the feed-forward control variable $u_{vs}$:

$$y = \tilde{G}_{vehicle}(s)u_{VS}.$$

Ideally, as the result from the feed-forward controller VS, the actual trajectory variable y should be identical to the setpoint trajectory variable w (i.e. identical to the first trajectory state), i.e. the following should apply: y=!w. The aim of the feed-forward controller VS in this example is therefore to use the one or more setpoint trajectory variables w and the model $\tilde{G}_{vehicle}(s)$ as a basis for determining the feed-forward control variable $u_{vs}$ in such a way that the following equation is satisfied $$w = \tilde{G}_{vehicle}(s)u_{VS}.$$

In this case, the feed-forward control variable $u_{vs}$ can potentially be calculated solely from the one or more setpoint trajectory variables w, w, w (or only w, w) and from the transfer model $\tilde{G}_{vehicle}(s)$ (or from the parameters thereof), wherein the feed-forward controller VS preferably makes do without applying a filter. This calculation is explained in detail further below with reference to FIGS. 5 and 6 based on specific examples for longitudinal guidance control and lateral guidance control.

Figure 4:
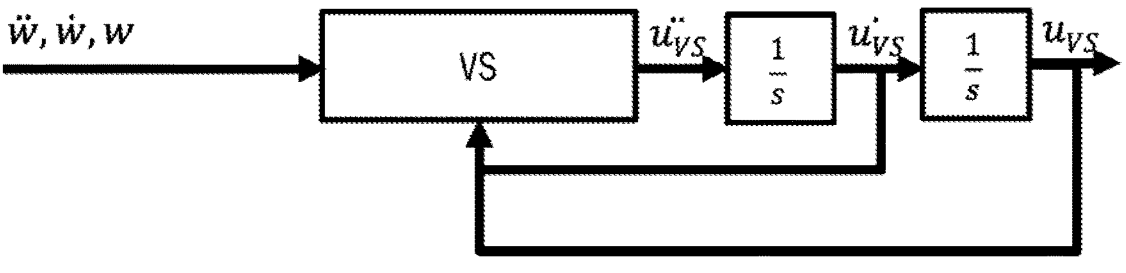
FIG. 4 illustrates by way of example, in a schematic signal flow diagram, the calculation of a feed-forward control variable in the feed-forward controller.

In particular in connection with the specific example of the lateral guidance control (cf. FIG. 6), it will also become clear that the calculation of a feed-forward control variable $u_{vs}$ can also contain, e.g., a plurality of integrations. This is illustrated in FIG. 4 in a schematic signal flow diagram. In the example of FIG. 4, there are three setpoint trajectory variables, namely w, w (the first temporal derivative of w) and w (the second temporal derivative of w). In the feed-forward controller VS, the feed-forward control variable $u_{vs}$ is calculated from these setpoint trajectory variables w, w, w and the parameters of the transfer model $\tilde{G}_{vehicle}(s)$ using two integration steps.

Generally, the feed-forward controller VS does not necessarily have to directly determine an actuation input for the actuator system AKT of the vehicle FZG, such as, e.g., a steering angle input or steering torque input for the lateral guidance or a longitudinal acceleration input for the longitudinal guidance. Rather, the feed-forward control variable $u_{vs}$ determined by the feed-forward controller VS can initially be further processed in one or more downstream controllers, such as, e.g., a vehicle guidance controller FFR and/or a subordinate steering or engine controller, as indicated in FIG. 2. In other words, the feed-forward controller VS can determine the feed-forward control variables $u_{vs}$ in such a way that they, if they are further processed within the scope of controlling the longitudinal and/or lateral guidance, result in the controlled system FFR, AKT, FZG realizing the setpoint trajectory variables w, $\dot{w}$, $\ddot{w}$, meaning that the vehicle FZG follows the planned trajectory.

In the example shown in FIG. 2, the controller comprises a trajectory-following controller TFR which is configured to use the feed-forward control variable $u_{vs}$ as a basis for determining the manipulated variable u. In this case, the trajectory-following controller TFR is used to ascertain one or more control errors Δx based on one or more reference variables x* and one or more feedback variables x (e.g. as the difference between a reference variable x* and a feedback variable x), and the feed-forward control variable $u_{vs}$ is corrected based on the one or more control errors Δx (e.g. by adding the control error Δx to the feed-forward control variable $u_{vs}$), the result of which is the manipulated variable u. In other words, in this example, the manipulated variable u is thus determined as the feed-forward control variable $u_{vs}$ corrected using the trajectory-following controller TFR. For example, in the trajectory-following controller TFR, a setpoint trajectory variable w or a variable derived from one or more setpoint trajectory variables w can be used as the reference variable x*. An actual trajectory variable y or a variable derived from one or more actual trajectory variables y can be used, e.g., as the feedback variable x.

Moreover, the controlled system FFR, AKT, FZG comprises a vehicle guidance controller FFR downstream of the trajectory-following controller TFR, which vehicle guidance controller is configured to use the manipulated variable u as a basis for determining an actuation input (or a control variable) for the actuator system AKT for the lateral and/or longitudinal guidance of the vehicle FZG. For example, the vehicle guidance controller FFR can, within the scope of lateral guidance control, which is explained more specifically further below with reference to FIG. 6, convert a corrected feed-forward control variable u in the form of a curvature input $k_d$ into an actuation input for the steering in the form of a setpoint steering angle δ.

Figure 1:
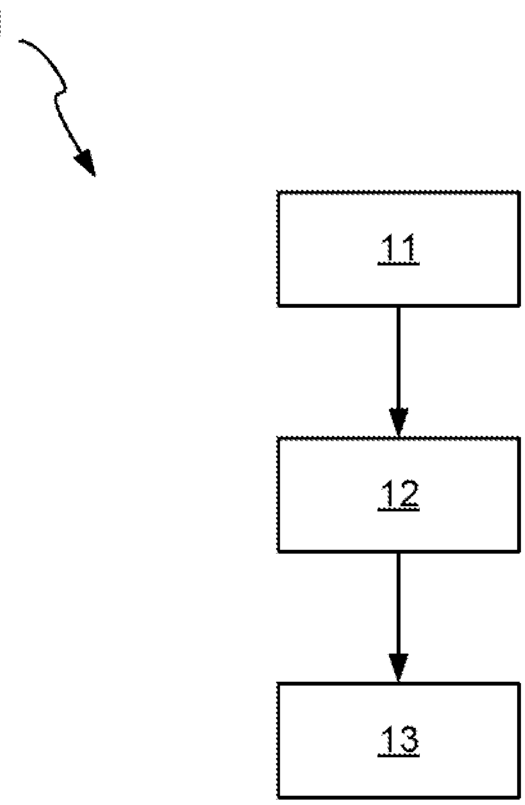
FIG. 1 shows a schematic flowchart of a method for controlling the longitudinal and/or lateral guidance of a vehicle.

In accordance with the above, within the scope of the method 1 illustrated in FIG. 1, the feed-forward control variable $u_{vs}$ can be used as a basis for determining an actuation input for the longitudinal and/or lateral guidance of the vehicle FZG. In particular, the actuation input can be generated as an actuation input for an actuator system AKT for the lateral and/or longitudinal guidance of the vehicle FZG.

Figures 5, 6:
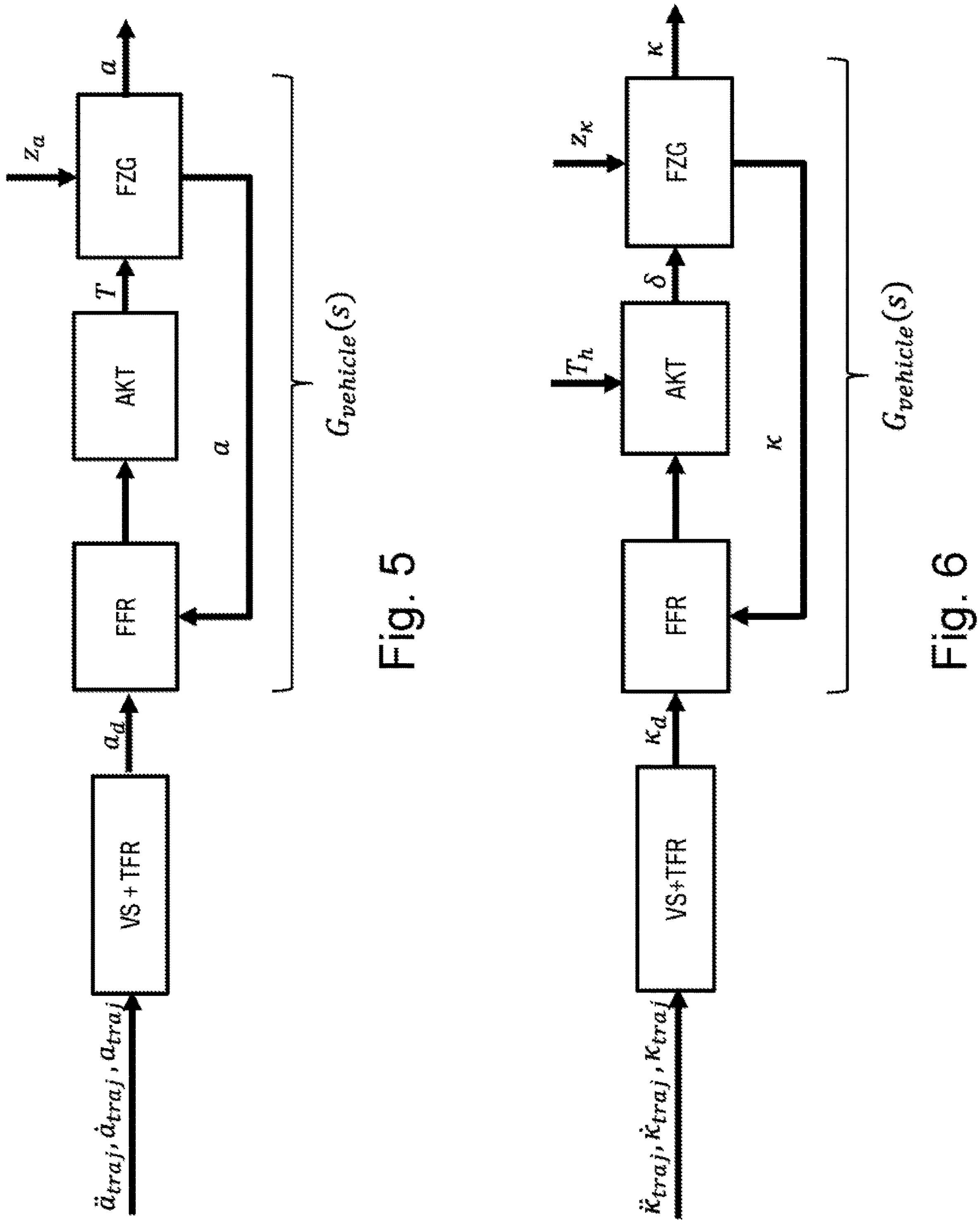
FIG. 5 schematically illustrates by way of example a controller for the longitudinal guidance of a vehicle.
FIG. 6 schematically illustrates by way of example a controller for the lateral guidance of a vehicle.

FIG. 5 schematically illustrates by way of example a controller for the longitudinal guidance of a vehicle FZG. In this case, a trajectory planner TPL (not shown separately in FIG. 5; cf. FIG. 2) ascertains a setpoint (longitudinal) acceleration, $a_{traj}$, a first temporal derivative of the setpoint (longitudinal) acceleration, $\dot{a}_{traj}$, and a second temporal derivative of the setpoint (longitudinal) acceleration, $\ddot{a}_{traj}$, as setpoint trajectory variables and transfers them as reference variables to a trajectory-following controller TFR with a feed-forward controller VS.

In the feed-forward controller VS and the trajectory-following controller TFR, the setpoint trajectory variables $\ddot{a}_{traj}$, $\dot{a}_{traj}$, $a_{traj}$ are used as a basis for determining a desired (longitudinal) acceleration da as a feed-forward control variable (that has already been corrected by a control error using the trajectory-following controller TFR).

The desired acceleration da is output as a manipulated variable to a controlled system FFR, AKT, FZG. In this example, the controlled system is also assigned a vehicle guidance controller FFR. The latter calculates, based on the desired acceleration da, one or more actuation inputs for an actuator system AKT which, in the present example of longitudinal guidance, comprises the engine and the braking system of the vehicle FZG. In this case, the actuator system AKT can also comprise one or more further subordinate controllers. The actuator system AKT ensures, e.g., a drive torque T which, considering the influence of disturbance variables $z_a$ (e.g. wind or an incline in the road), results in an acceleration a of the vehicle FZG. The actual acceleration a is measured and fed back to the vehicle guidance controller FFR as a feedback variable.

In the example according to FIG. 5, the controlled system FFR, AKT, FZG has in total one transfer behavior $\tilde{G}_{vehicle}(s)$ which can be very complex. The feed-forward controller VS can therefore operate based on a simplified transfer model which, e.g., is described by a transfer function in the form $$\tilde{G}_{vehicle}(s) = \frac{1}{a_2 s^2 + a_1 s + a_0}.$$

From the equation $a=\tilde{G}_{vehicle}(s)*a_d$ and the requirement $a=!a_{traj}$, which describes the actual aim of the feed-forward controller VS, the following equation then follows $$a_{traj} a_2 s^2 + a_{traj} a_1 s + a_{traj} a_0 = a_d.$$

After back transformation from the frequency domain into the time domain, the result is that the feed-forward control variable $a_d$ can be calculated directly from the setpoint trajectory variables $\ddot{a}_{traj}$, $\dot{a}_{traj}$, $a_{traj}$ and the parameters $a_0$, $a_1$, $a_2$ of the transfer function $\tilde{G}_{vehicle}(s)$ as $$a_d = \ddot{a}_{traj} a_2 + \dot{a}_{traj} a_1 + a_{traj} a_0.$$

It should be noted that, in the above paragraph, the feed-forward control variable that is to be determined (but has still not been corrected by a control error using a trajectory-following controller TFR), in the feed-forward controller VS itself, was referred to as $a_d$. The desired acceleration da, which according to FIG. 5 is transferred to the vehicle-following controller FFR, can however generally also be a feed-forward control variable which has already been corrected by a control error using a trajectory-following controller TFR.

FIG. 6 schematically illustrates, as a further example, a controller for the lateral guidance of a vehicle FZG. The basic design of the controller can be understood to be the same as that of the longitudinal guidance controller explained above with reference to FIG. 5. In the case of the lateral guidance control, the trajectory planner TPL (not shown in FIG. 6; cf. FIG. 2) ascertains, e.g., a time-dependent setpoint curvature, $\kappa_{traj}$, a first temporal derivative of the setpoint curvature, $\dot{\kappa}_{traj}$, and a second temporal derivative of the setpoint curvature, $\ddot{\kappa}_{traj}$, as setpoint trajectory variables and transfers them as reference variables to the feed-forward controller VS and the trajectory-following controller TFR.

In the feed-forward controller VS and the trajectory-following controller TFR, the setpoint trajectory variables $\ddot{\kappa}_{traj}$, $\dot{\kappa}_{traj}$, $\kappa_{traj}$ are used as a basis for determining a desired curvature $\kappa_d$ as a feed-forward control variable (that is already corrected by a control error by way of the trajectory-following controller TFR).

The desired curvature $\kappa_d$ is output as a manipulated variable to a controlled system FFR, AKT, FZG. The vehicle guidance controller FFR calculates, based on the desired curvature $\kappa_d$, one or more actuation inputs for an actuator system AKT which, in the present example of the lateral guidance, in particular comprises the steering of the vehicle FZG. In this case, the actuator system AKT can additionally comprise one or more further subordinate controllers which can consider, e.g., an influence of a steering torque $T_h$ exerted manually by a driver of the vehicle FZG. The actuator system AKT sets, e.g., a steering angle δ which, considering the influences of interference variables $z_k$ (e.g. wind or an incline in the road), results in a trajectory of the vehicle FZG which has a curvature k. The actual curvature k is measured and fed back to the vehicle guidance controller FFR as a feedback variable.

The simplified model of the dynamic behavior of the vehicle FZG can be described, in the feed-forward controller VS, in this example e.g. by a transfer function in the form $$\tilde{G}_{vehicle}(s) = \frac{b_2 s^2 + b_1 s + b_0}{a_2 s^2 + a_1 s + a_0}.$$

From the equation $k=\tilde{G}_{vehicle}(s)*k_d$ and the requirement $k=!k_{traj}$, the following equation follows $$\kappa_{traj} a_2 s^2 + \kappa_{traj} a_1 s + \kappa_{traj} a_0 = \kappa_d b_2 s^2 + \kappa_d b_1 s + \kappa_d b_0.$$

After back transformation from the frequency domain into the time domain and adjusting the equation, the result is that the feed-forward control variable $\kappa_d$ can be calculated from the setpoint trajectory variables $\ddot{\kappa}_{traj}$, $\dot{\kappa}_{traj}$, $\kappa_{traj}$ and the parameters $a_0$, $a_1$, $a_2$, $b_0$, $b_1$, $b_2$ of the transfer function $\tilde{G}_{vehicle}(s)$ using the equation $$\ddot{\kappa}_d = \frac{1}{b_2}(\dot{\kappa}_d b_1 + \kappa_d b_0 - \ddot{\kappa}_{traj} a_2 - \dot{\kappa}_{traj} a_1 - \kappa_{traj} a_0)$$

(or an adjusted, equivalent equation). In this case, the calculation can comprise, e.g., two integration steps, as was explained further above with reference to the schematic signal flow diagram in FIG. 4 which can be applied to the feed-forward controller VS in the example according to FIG. 6.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

What is claimed is:

1. An electronic device for controlling longitudinal and/or lateral guidance of a vehicle, comprising:
- a trajectory planner configured to ascertain setpoint trajectory variables for a trajectory of the vehicle, wherein the setpoint trajectory variables comprise:
  - a first trajectory state, and
  - a second trajectory state, wherein the second trajectory state corresponds to a first time derivative in the first trajectory state over time; and
- a feed-forward controller configured to calculate a feed-forward control variable from the setpoint trajectory variables as a function of the first trajectory state and the second trajectory state, and from a model of dynamic behavior of the vehicle, wherein
  - the feed-forward control variable and the first trajectory state are variables of the same type,
  - the device is configured to use the feed-forward control variable as a basis for determining a manipulated variable for a controlled system within the scope of the longitudinal and/or lateral guidance,
  - the manipulated variable and the feed-forward control variable are variables of the same type, and
  - the device is configured to use the manipulated variable to control the longitudinal and/or lateral guidance of the vehicle.

2. The device according to claim 1, wherein the setpoint trajectory variables further comprise a third trajectory state that corresponds to a change in the second trajectory state over time.

3. The device according to claim 1, wherein the model describes a non-invertible transfer system.

4. The device according to claim 1, wherein the feed-forward controller is configured to approximately compensate for dynamic behavior of the vehicle corresponding to the model.

5. The device according to claim 1, wherein the feed-forward controller is configured to calculate the feed-forward control variable without applying a filter.

6. The device according to claim 1, wherein the model of the dynamic behavior of the vehicle is described, in the feed-forward controller (VS), by a transfer function in the form:

$$\tilde{G}_{vehicle}(s) = \frac{b_n s^n + b_{n-1} s^{n-1} + \ldots + b_1 s + b_0}{a_m s^m + a_{m-1} s^{m-1} + \ldots + a_1 s + a_0}.$$

7. The device according to claim 1, wherein the model of the dynamic behavior of the vehicle is described, in the feed-forward controller (VS), by a transfer function in the form:

$$\tilde{G}_{vehicle}(s) = \frac{1}{a_1 s + a_0}.$$

8. The device according to claim 7, wherein if w, ẇ are the setpoint trajectory variables and $u_{vs}$ is the feed-forward control variable that is to be determined in the feed-forward controller (VS), the feed-forward control variable $u_{vs}$ is calculated from the setpoint trajectory variables w, w and parameters $a_0$, $a_1$ of the transfer function as:

$$u_{VS} = \dot{w} a_1 + w a_0.$$

9. The device according to claim 1, wherein the model of the dynamic behavior of the vehicle (FZG) is described, in the feed-forward controller (VS), by a transfer function in the form:

$$\tilde{G}_{vehicle}(s) = \frac{1}{a_2 s^2 + a_1 s + a_0}.$$

10. The device according to claim 9, wherein if ätraj, $\dot{a}_{traj}$, $a_{traj}$ are the setpoint trajectory variables and da is the feed-forward control variable that is to be determined in the feed-forward controller (VS), the feed-forward control variable $a_d$ is calculated from the setpoint trajectory variables $\ddot{a}_{traj}$, $\dot{a}_{traj}$, $a_{traj}$ and parameters $a_0$, $a_1$, $a_2$ of the transfer function as:

$$a_d = \ddot{a}_{traj} a_2 + \dot{a}_{traj} a_1 + a_{traj} a_0.$$

11. The device according to claim 1, wherein the model of the dynamic behavior of the vehicle (FZG) is described, in the feed-forward controller (VS), by a transfer function in the form:

$$\tilde{G}_{vehicle}(s) = \frac{b_2 s^2 + b_1 s + b_0}{a_2 s^2 + a_1 s + a_0}.$$

12. The device according to claim 11, wherein if $\ddot{k}_{traj}$, $\dot{k}_{traj}$, $k_{traj}$ are the setpoint trajectory variables and ka is the feed-forward control variable that is to be determined in the feed-forward controller (VS), the feed-forward control variable $k_d$ is calculated from the setpoint trajectory variables $\ddot{k}_{traj}$, $\dot{k}_{traj}$, $k_{traj}$ and parameters $a_0$, $a_1$, $a_2$, $b_0$, $b_1$, $b_2$ of the transfer function using the equation:

$$\ddot{\kappa}_d = \frac{1}{b_2}(\dot{\kappa}_d b_1 + \kappa_d b_0 - \ddot{\kappa}_{traj} a_2 - \dot{\kappa}_{traj} a_1 - \kappa_{traj} a_0).$$

13. The device according to claim 1, wherein the device comprises a trajectory-following controller configured to use the feed-forward control variable as a basis for determining the manipulated variable.

14. The device according to claim 13, wherein the device is further configured to:

ascertain, using the trajectory-following controller, one or more control errors on the basis of one or more reference variables and one or more feedback variables;

correct the feed-forward control variable on the basis of the one or more control errors; and determine the manipulated variable as the corrected feed-forward control variable or on the basis of the corrected feed-forward control variable.

15. The device according to claim 1, wherein the controlled system comprises:

a vehicle guidance controller configured to use the manipulated variable as a basis for determining an actuation input for an actuator system for the lateral and/or longitudinal guidance of the vehicle.

16. A method for controlling longitudinal and/or lateral guidance of a vehicle, comprising:

ascertaining setpoint trajectory variables for a trajectory of the vehicle, wherein the setpoint trajectory variables comprise:

a first trajectory state, and a second trajectory state, wherein the second trajectory state corresponds to a first time derivative in the first trajectory state over time;

calculating, using a feed-forward controller, a feed-forward control variable from the setpoint trajectory variables as a function of the first trajectory state and the second trajectory state, and from a model of the dynamic behavior of the vehicle, wherein the feed-forward control variable and the first trajectory state are variables of the same type;

determining, based on the feed-forward control variable, a manipulated variable for a controlled system within the scope of the longitudinal and/or lateral guidance, wherein the manipulated variable and the feed-forward control variable are variables of the same type; and using the manipulated variable to control the longitudinal and/or lateral guidance of the vehicle.

* * * * *